US011967446B2

(12) United States Patent
Liu et al.

(10) Patent No.: US 11,967,446 B2
(45) **Date of Patent: *Apr. 23, 2024**

(54) PACKAGING STRUCTURE OF A MAGNETIC DEVICE

(71) Applicant: CYNTEC CO., LTD., Hsinchu (TW)

(72) Inventors: Chun-Tiao Liu, Hsinchu (TW); Lan-Chin Hsieh, Kaohsiung (TW); Tsung-Chan Wu, Hsinchu County (TW); Chi-Hsun Lee, Taipei (TW); Chih-Siang Chuang, Hsinchu (TW)

(73) Assignee: CYNTEC CO., LTD., Hsinchu (TW)

( * ) Notice: Subject to any disclaimer, the term of this patent is extended or adjusted under 35 U.S.C. 154(b) by 359 days.

This patent is subject to a terminal disclaimer.

(21) Appl. No.: 17/140,143

(22) Filed: Jan. 4, 2021

(65) Prior Publication Data

US 2021/0125767 A1 Apr. 29, 2021

Related U.S. Application Data

(63) Continuation of application No. 15/935,067, filed on Mar. 26, 2018, now Pat. No. 10,902,989, which is a continuation of application No. 14/941,647, filed on Nov. 15, 2015, now Pat. No. 9,959,965, which is a continuation of application No. 14/251,105, filed on Apr. 11, 2014, now Pat. No. 9,230,728, which is a (Continued)

(51) Int. Cl.

| | |
|---|---|
| ***H01F 27/25*** | (2006.01) |
| ***H01F 1/147*** | (2006.01) |
| ***H01F 17/04*** | (2006.01) |
| ***H01F 27/02*** | (2006.01) |
| ***H01F 27/255*** | (2006.01) |
| ***H01F 27/28*** | (2006.01) |
| ***H01F 27/29*** | (2006.01) |

(52) U.S. Cl.

CPC ....... *H01F 27/022* (2013.01); *H01F 1/14741* (2013.01); *H01F 1/14766* (2013.01); *H01F 1/14791* (2013.01); *H01F 17/045* (2013.01); *H01F 27/255* (2013.01); *H01F 27/2828* (2013.01); *H01F 27/29* (2013.01)

(58) Field of Classification Search

CPC ............... H01F 27/022; H01F 1/14741; H01F 1/14766; H01F 1/14791; H01F 17/045; H01F 27/255; H01F 27/2828; H01F 27/29; H01F 27/24; H01F 3/08; H01F 27/26

See application file for complete search history.

(56) References Cited

U.S. PATENT DOCUMENTS

2008/0100410 A1* 5/2008 Tomita .................... H01F 17/04 420/92
2010/0182115 A1* 7/2010 Huang .................. H01F 17/045 336/83

(Continued)

*Primary Examiner* — Mang Tin Bik Lian

(74) *Attorney, Agent, or Firm* — Min-Lee Teng

(57) ABSTRACT

An inductor is disclosed, the inductor comprising: a T-shaped magnetic core, being made of a material comprising an annealed soft magnetic metal material and having a base and a pillar integrally formed with the base, wherein $\mu C \times Hsat \geq 1800$, where μC is a permeability of the T-shaped magnetic core, and Hsat (Oe) is a strength of the magnetic field at 80% of μC0, where μC0 is the permeability of the T-shaped magnetic core when the strength of the magnetic field is 0.

12 Claims, 12 Drawing Sheets

Related U.S. Application Data continuation of application No. 13/738,674, filed on Jan. 10, 2013, now Pat. No. 8,723,629.

(56) References Cited

U.S. PATENT DOCUMENTS

| | | | | |
|---|---|---|---|---|
| 2010/0245015 | A1* | 9/2010 | Shang | H01F 41/0246<br>264/250 |
| 2010/0253456 | A1* | 10/2010 | Yan | H01F 27/306<br>336/83 |
| 2010/0277267 | A1* | 11/2010 | Bogert | H01F 3/10<br>29/606 |
| 2012/0092111 | A1* | 4/2012 | Tsuchiya | C22C 45/02<br>336/83 |
| 2012/0299687 | A1* | 11/2012 | Liao | H01F 17/04<br>336/221 |

* cited by examiner

PACKAGING STRUCTURE OF A MAGNETIC DEVICE

CROSS-REFERENCE TO RELATED APPLICATIONS

This application is a continuation of U.S. application Ser. No. 15/935,067 filed on Mar. 26, 2018, which is a continuation of U.S. application Ser. No. 14/941,647 filed on Nov. 15, 2015, which is a continuation of U.S. application Ser. No. 14/251,105 filed on Apr. 11, 2014, which is a continuation of U.S. application Ser. No. 13/738,674 filed on Jan. 10, 2013, and the entirety of the above-mentioned US application is incorporated by reference herein and made a part of specification.

BACKGROUND OF THE INVENTION

1. Field of the Invention

The present invention relates to a magnetic device, and more particularly to a choke with high saturation current and low core loss.

2. Background of the Invention

A choke is one type of magnetic device used for stabilizing a circuit current to achieve a noise filtering effect, and a function thereof is similar to that of a capacitor, by which stabilization of the current is adjusted by storing and releasing electrical energy of the circuit. Compared to the capacitor that stores the electrical energy by an electrical field (electric charge), the choke stores the same by a magnetic field.

FIG. 1A illustrates a conventional choke with a toroidal core. However, a traditional choke with a toroidal core requires manual winding of the wire coil onto the toroidal core. Therefore, the manufacturing cost of a traditional choke is high due to the high labor cost.

In addition, chokes are generally applied in electronic devices. Recent trends to produce increasingly powerful, yet smaller chokes have led to numerous challenges to the electronics industry. In particular, when the size of a traditional choke with a toroidal core is reduced to a certain extent, it becomes more and more difficult to manually wind the wire coil onto the smaller toroidal core, and the choke can no longer produce a desired output at a high saturation current.

FIG. 1B illustrates a conventional sealed choke with a ferrite core. However, the sealed choke cannot produce a desired output at a high saturation current. In addition, it also becomes more and more difficult to wind the wire coil onto the ferrite core when the size of the sealed choke shrinks to a certain extent.

FIG. 1C illustrates a conventional molding choke with an iron-powder core. However, the iron-powder core has a relatively high core loss. In addition, since the wire coil is placed in the mold during the molding process and the wire coil cannot sustain high temperature, it is not possible to perform an annealing process to reduce the core loss of the molded core after the molding process.

In view of the above, how to reduce the manufacturing cost and minimize the size of the chokes while still keeping the features of high saturation current and low core loss at heave load becomes an important issue to be solved.

SUMMARY OF THE INVENTION

Accordingly, it is an object of the present invention to provide a low cost, compact choke with high saturation current at heavy load and low core loss at light load.

To achieve the above-mentioned object, in accordance with one aspect of the present invention, a magnetic device comprises: a T-shaped magnetic core including a base and a pillar, the base having a first surface and a second surface opposite to the first surface, the pillar being located on the first surface of the base, the second surface of the base being exposed to outer environment as an outer surface of the choke, the T-shaped magnetic core being made of an annealed soft magnetic metal material, a core loss $P_{CL}$ (mW/cm$^3$) of the T-shaped magnetic core satisfying: $0.64\times f^{0.95}\times B_m^{2.20}\leq P_{CL}\leq 7.26\times f^{1.41}\times B_m^{1.88}$, where f (kHz) represents a frequency of a magnetic field applied to the T-shaped magnetic core, and Bm (kGauss) represents the operating magnetic flux density of the magnetic field at the frequency; a wire coil surrounding the pillar, the wire coil having two leads; and a magnetic body fully covering the pillar, any part of the base that is located above the second surface of the base, and any part of the wire coil that is located directly above the first surface of the base.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE ILLUSTRATED EMBODIMENTS

Figure 1A:
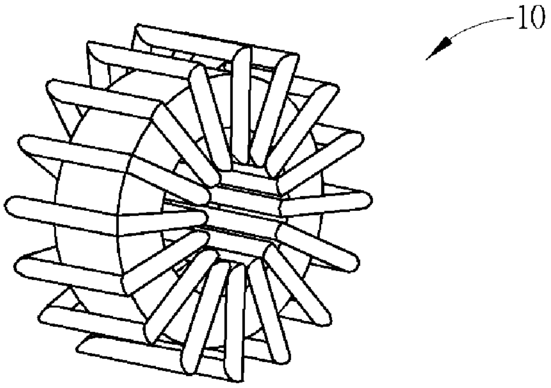
FIGS. 1A-1C illustrate three types of conventional chokes.
Figure 1B:
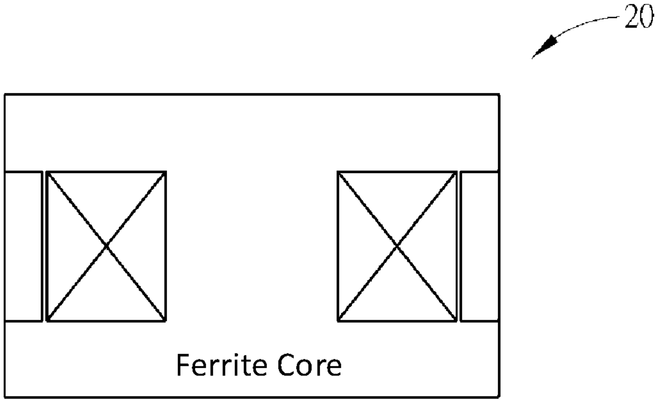
Figure 1C:
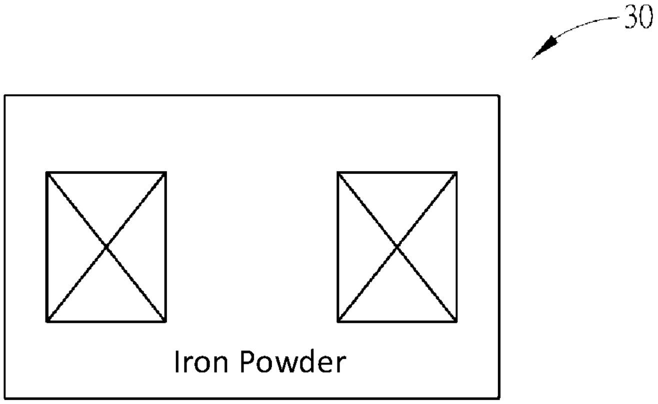

The present invention will now be described in detail with reference to the accompanying drawings, wherein the same reference numerals will be used to identify the same or similar elements throughout the several views. It should be noted that the drawings should be viewed in the direction of orientation of the reference numerals.

Figure 2A:
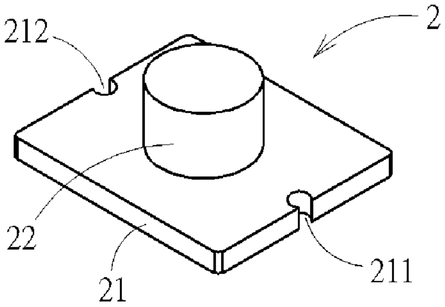
FIGS. 2A-2G illustrate a prospective view of a T-shaped magnetic core, a wire coil, and a choke in accordance with various embodiments of the present invention.
Figure 2B:
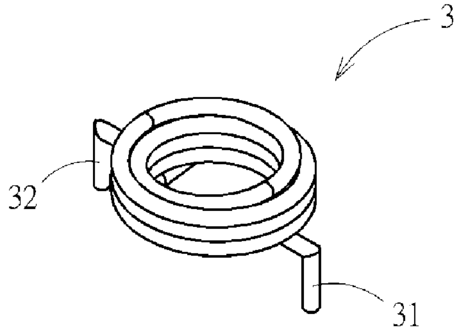
Figure 2C:
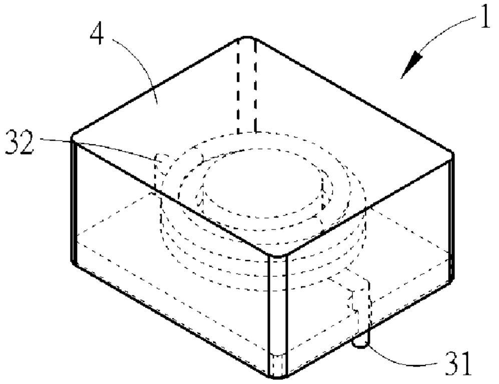

FIGS. 2A-2C is a perspective view of a choke in accordance with an embodiment of the present invention. As embodied in FIGS. 2A-2C, the choke 1 as a magnetic device comprises a T-shaped magnetic core 2, a wire coil 3 and a magnetic body 4. The T-shaped magnetic core 2 includes a base 21 and a pillar 22. The base 21 has a first/top surface and a second/bottom surface opposite to the first/top surface. The pillar 22 is located on the first/top surface of the base 21. The second/bottom surface of the base 21 is exposed to the outer environment as an outer surface of the choke 1. The wire coil 3 forms a hollow part for accommodating the pillar 22 such that the wire coil 3 surrounds the pillar 22. In one embodiment of the present invention, as shown in FIG. 2C, the wire has two leads 31, 32 as welding pins without the need of using electrodes on the base 21. In another embodiment of the present invention, as shown in FIG. 3D, the wire has two leads 31, 32 respectively connected to two electrodes 5 and 6 on the base 21. The magnetic body 4 fully covers the pillar 22, any part of the base 21 that is located above the second/bottom surface of the base 21, and any part of the wire coil 3 that is located above the first/top surface of the base 21.

In an embodiment of the present invention, the T-shaped magnetic core 2 is made of an annealed soft magnetic metal material. In particular, a soft magnetic metal material selected from the group consisting of Fe—Si alloy powder, Fe—Si—Al alloy powder, Fe—Ni alloy powder, Fe—Ni—Mo alloy powder, and a combination of two or more thereof is first pressed to form the T-shaped structure (i.e., base+pillar) of the T-shaped magnetic core 2. After the T-shaped structure is formed, an annealing process is performed on the T-shaped structure to obtain the annealed T-shaped magnetic core 2 with low core loss.

A relationship can be used describe the core losses of the magnetic material. This relationship takes the following form:

$$P_L = C \times f^a \times B_m^{\ b},$$

In this relationship, $P_L$ is the core loss per unit volume ($mW/cm^3$), f (kHz) represents a frequency of a magnetic field applied to the magnetic material, and Bm (kGauss, and is usually less than one (1)) represents the operating magnetic flux density of the magnetic field at the frequency. In addition, the coefficients C, a and b are based on factors such as the permeability of the magnetic materials.

TABLES 1-4 illustrate the coefficients C, a and b when different soft magnetic metal materials with different permeabilities are used to form the annealed T-shaped magnetic core 2.

TABLE 1

| Fe—Ni—Mo alloy powder (MPP) | | | |
|---|---|---|---|
| Permeability $\mu_{CC}$ | C | a | b |
| 14 | 2.33 | 1.31 | 2.19 |
| 26 | 1.39 | 1.28 | 1.29 |
| 60 | 0.64 | 1.41 | 2.20 |
| 125 | 1.02 | 1.40 | 2.03 |
| 147 | 1.08 | 1.40 | 2.04 |
| 160 | 1.08 | 1.40 | 2.04 |
| 173, 200 | 1.08 | 1.40 | 2.04 |

TABLE 2

| Fe—Ni alloy powder (High Flux) | | | |
|---|---|---|---|
| Permeability $\mu_{CC}$ | C | a | b |
| 14 | 7.26 | 0.95 | 1.91 |
| 26 | 3.19 | 1.22 | 1.08 |
| 60 | 3.65 | 1.15 | 2.16 |
| 125 | 1.62 | 1.32 | 2.20 |
| 147 | 1.74 | 1.32 | 2.10 |
| 160 | 1.74 | 1.32 | 2.10 |

TABLE 3

| Fe—Si—Al alloy powder (Sendust) | | | |
|---|---|---|---|
| Permeability $\mu_{CC}$ | C | a | b |
| 14 | 3.18 | 1.21 | 2.09 |
| 26 | 2.27 | 1.26 | 2.08 |
| 60, 75, 90, 125 | 2.00 | 1.31 | 2.16 |

TABLE 4

| Fe—Si alloy powder (Power Flux) | | | |
|---|---|---|---|
| Permeability $\mu_{CC}$ | C | a | b |
| 60, 90 | 4.79 | 1.25 | 2.05 |

In view of the above, in accordance with some embodiments of the present invention, the core loss $P_{CL}$ ($mW/cm^3$) of the annealed T-shaped magnetic core 2 satisfies:

$$0.64 \times f^{0.95} \times B_m^{\ 2.20} \le P_{CL} \le 7.26 \times f^{1.41} \times B_m^{\ 1.08}.$$

In some embodiments of the present invention, the permeability $\mu_C$ of the annealed T-shaped magnetic core 2 has the average permeability $\mu_{CC}$ with ±20% deviation, and the average permeability $\mu_{CC}$ is equal or larger than 60. For example, the annealed T-shaped magnetic core 2 is an annealed T-shaped structure made from soft magnetic metal material such as Fe—Si alloy powder with the average permeability $\mu_{CC}$ of the annealed T-shaped magnetic core 2 between 60 and 90 (i.e., permeability $\mu_C$ is between 48 (i.e., 80% of 60) and 108 (120% of 90)), Fe—Si—Al alloy powder with the average permeability $\mu_{CC}$ of the annealed T-shaped magnetic core 2 between 60 and 125 (i.e., permeability $\mu_C$ is between 48 (i.e., 80% of 60) and 150 (120% of 125)), Fe—Ni alloy powder with the average permeability $\mu_{CC}$ of the annealed T-shaped magnetic core 2 between 60 and 160 (i.e., permeability $\mu_C$ is between 48 (i.e., 80% of 60) and 192 (120% of 160)), or Fe—Ni—Mo alloy powder with the average permeability $\mu_{CC}$ of the annealed T-shaped magnetic core 2 between 60 and 200 (i.e., permeability $\mu_C$ is between 48 (i.e., 80% of 60) and 240 (120% of 200)), and the core loss $P_{CL}$ (mW/cm$^3$) of the annealed T-shaped magnetic core 2 satisfies:

$$0.64 \times f^{1.15} \times B_m^{2.20} \leq P_{CL} \leq 4.79 \times f^{1.41} \times B_m^{1.08}.$$

In some embodiments of the present invention, the annealed T-shaped magnetic core 2 is an annealed T-shaped structure made from soft magnetic metal material such as Fe—Si—Al alloy powder with the average permeability $\mu_{CC}$ of the annealed T-shaped magnetic core 2 between 60 and 125 (i.e., permeability $\mu_C$ is between 48 (i.e., 80% of 60) and 150 (120% of 125)), Fe—Ni alloy powder with the average permeability $\mu_{CC}$ of the annealed T-shaped magnetic core 2 between 60 and 160 (i.e., permeability $\mu_C$ is between 48 (i.e., 80% of 60) and 192 (120% of 160)), or Fe—Ni—Mo alloy powder with the average permeability $\mu_{CC}$ of the annealed T-shaped magnetic core 2 between 60 and 200 (i.e., 80% of 60) and 240 (120% of 200)), and the core loss $P_{CL}$ (mW/cm$^3$) of the annealed T-shaped magnetic core 2 satisfies:

$$0.64 \times f^{1.31} \times B_m^{2.20} \leq P_{CL} \leq 2.0 \times f^{1.41} \times B_m^{1.08}$$

In addition, the value of $\mu_{CC}$×Hsat is a major bottleneck for the current tolerance of a choke, where Hsat (Oe) is a strength of the magnetic field at 80% of $\mu_{C0}$, and $\mu_{C0}$ is the permeability of the T-shaped magnetic core 2 when the strength of the magnetic field is 0. TABLE 5 illustrates the value of $\mu_{CC}$×Hsat when different annealed soft magnetic metal materials with different permeabilities are used to form the annealed T-shaped magnetic core 2.

TABLE 5

| Core Material | Fe—Si—Al alloy powder (Sendust) | | | | Fe—Si alloy powder (Power Flux) | |
|---|---|---|---|---|---|---|
| μcc | 60 | 75 | 90 | 125 | 60 | 90 |
| Hsat (Oe) | 42 | 32 | 29 | 18 | 70 | 48 |
| μcc × Hsat | 2520 | 2400 | 2610 | 2250 | 4200 | 4320 |

| Core Material | Fe—Ni—Mo alloy powder (MPP) | | | | | |
|---|---|---|---|---|---|---|
| μcc | 60 | 125 | 147 | 160 | 173 | 200 |
| Hsat (Oe) | 60 | 30 | 28 | 23 | 21 | 16 |
| μcc × Hsat | 3600 | 3750 | 4116 | 3680 | 3633 | 3200 |

| Core Material | Fe—Ni alloy powder (High Flux) | | | |
|---|---|---|---|---|
| μcc | 60 | 125 | 147 | 160 |
| Hsat (Oe) | 105 | 42 | 39 | 32 |
| μcc × Hsat | 6300 | 5250 | 5733 | 5120 |

In view of the above, in accordance with the embodiments of the present invention, the following requirement is also satisfied:

$$\mu_{CC} \times \text{Hsat} \leq 2250$$

Figure 3A:
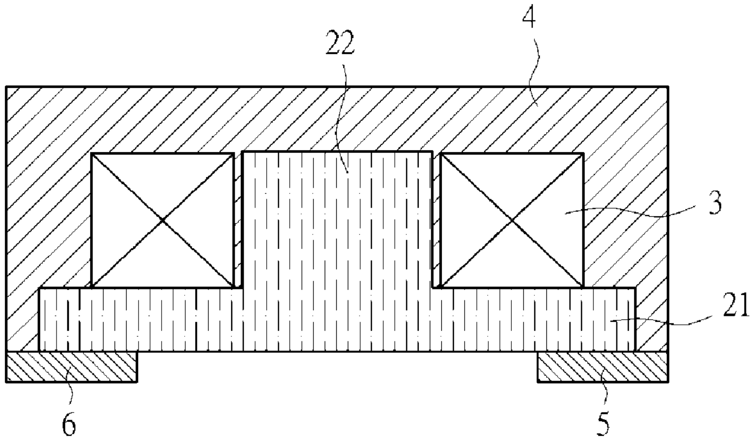
FIG. 3A is a cross-sectional view of a choke in accordance with an embodiment of the present invention.
Figure 3B:
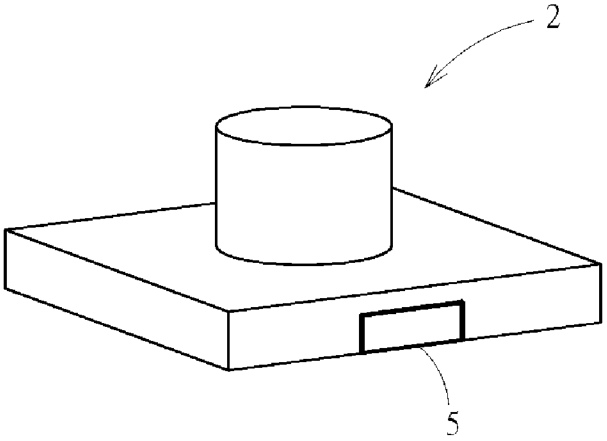
FIG. 3B is a prospective view of a T-shaped magnetic core in accordance with another embodiment of the present invention.
Figure 3C:
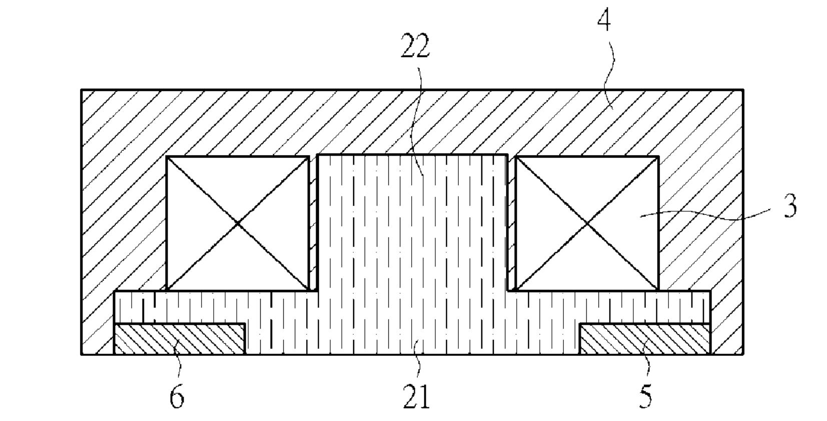
FIG. 3C is a cross-sectional view of a choke with the T-shaped magnetic core as show in FIG. 3B in accordance with an embodiment of the present invention.
Figure 3D:
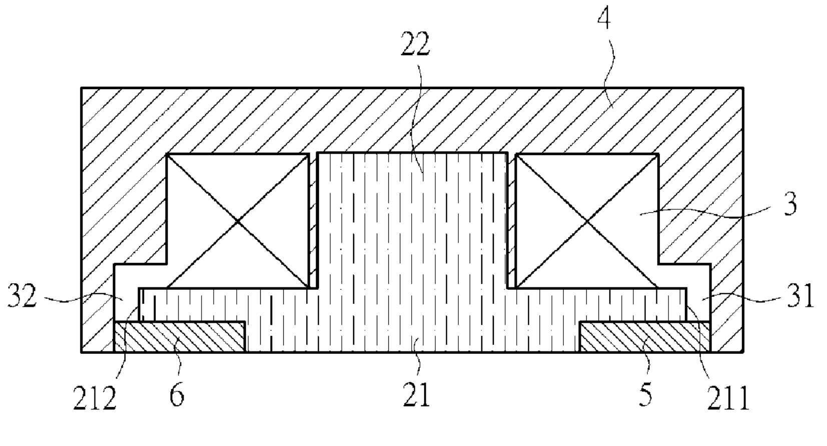
FIG. 3D is a cross-sectional view of a choke in accordance with still another embodiment of the present invention.

In an embodiment of the present invention, the two electrodes 5, 6 are located at the bottom of the base 21, as show in FIG. 3A. In another embodiment of the present invention, the two electrodes 5, 6 are embedded in the base 21, as shown in FIGS. 3B, 3C and 3D. As shown in FIG. 3B, the bottom surface of each of the two electrodes 5, 6 is substantially coplanar with the second/bottom surface of the base 21, and a lateral surface of each of the two electrodes 5, 6 is substantially coplanar with a corresponding one of two opposite lateral surfaces of the base 21. The embedded electrodes provide the features that more magnetic materials can occupy the annealed T-shaped magnetic core 2 when the dimension of the annealed T-shaped magnetic core 2 is fixed, which enhance the effective permeability of the annealed T-shaped magnetic core 2.

Figure 2D:
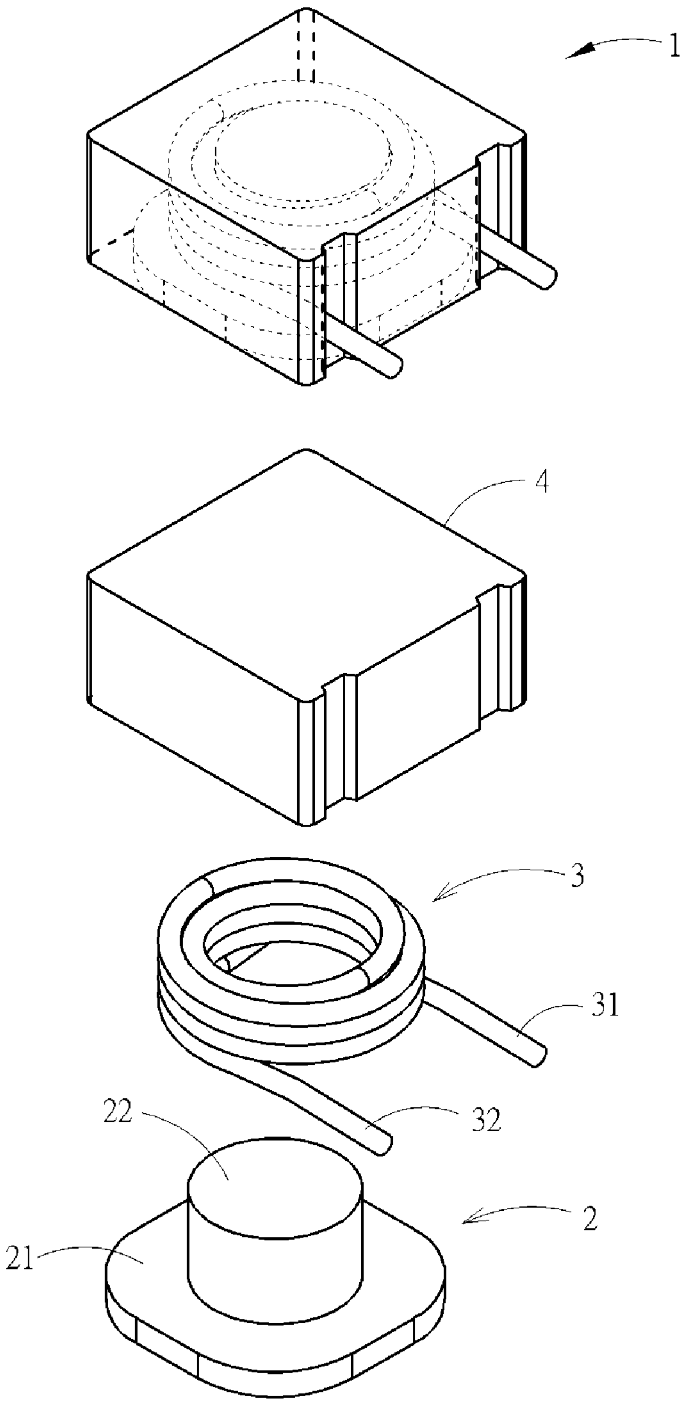
Figure 2E:
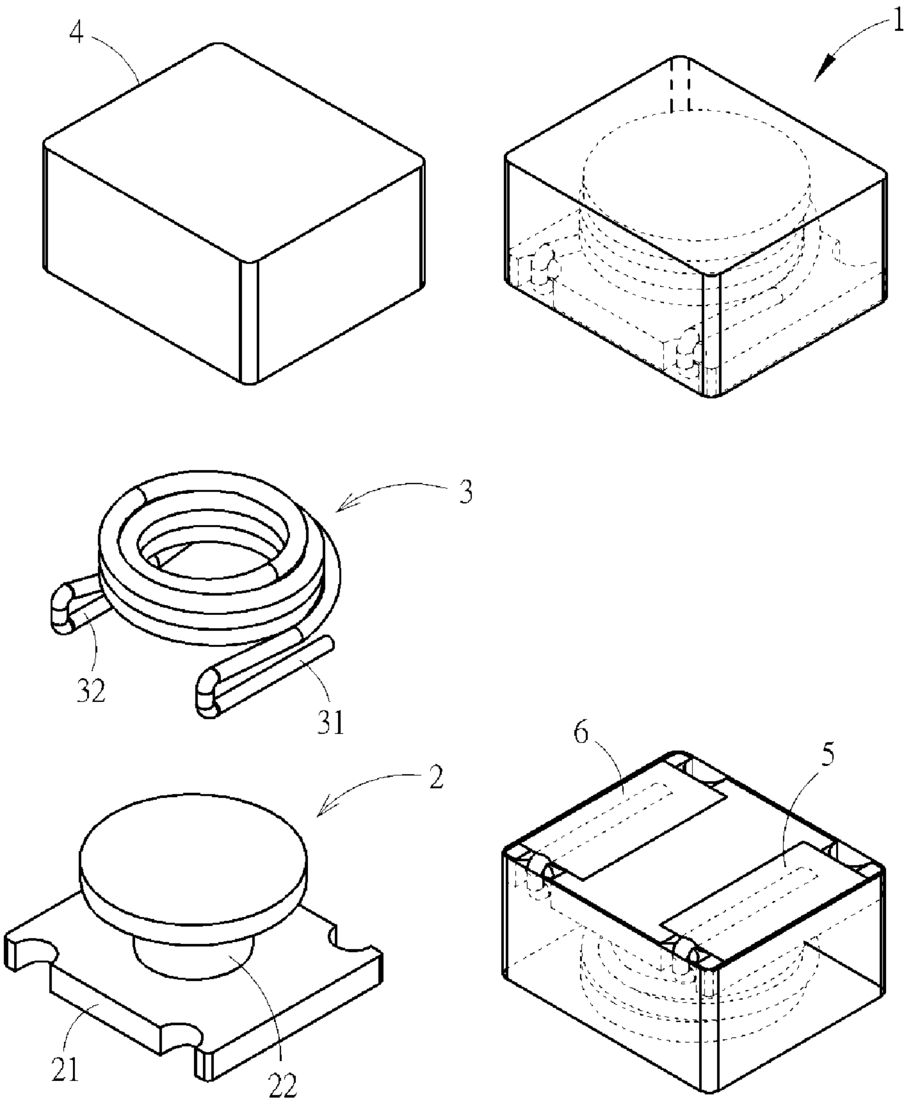
Figure 2F:
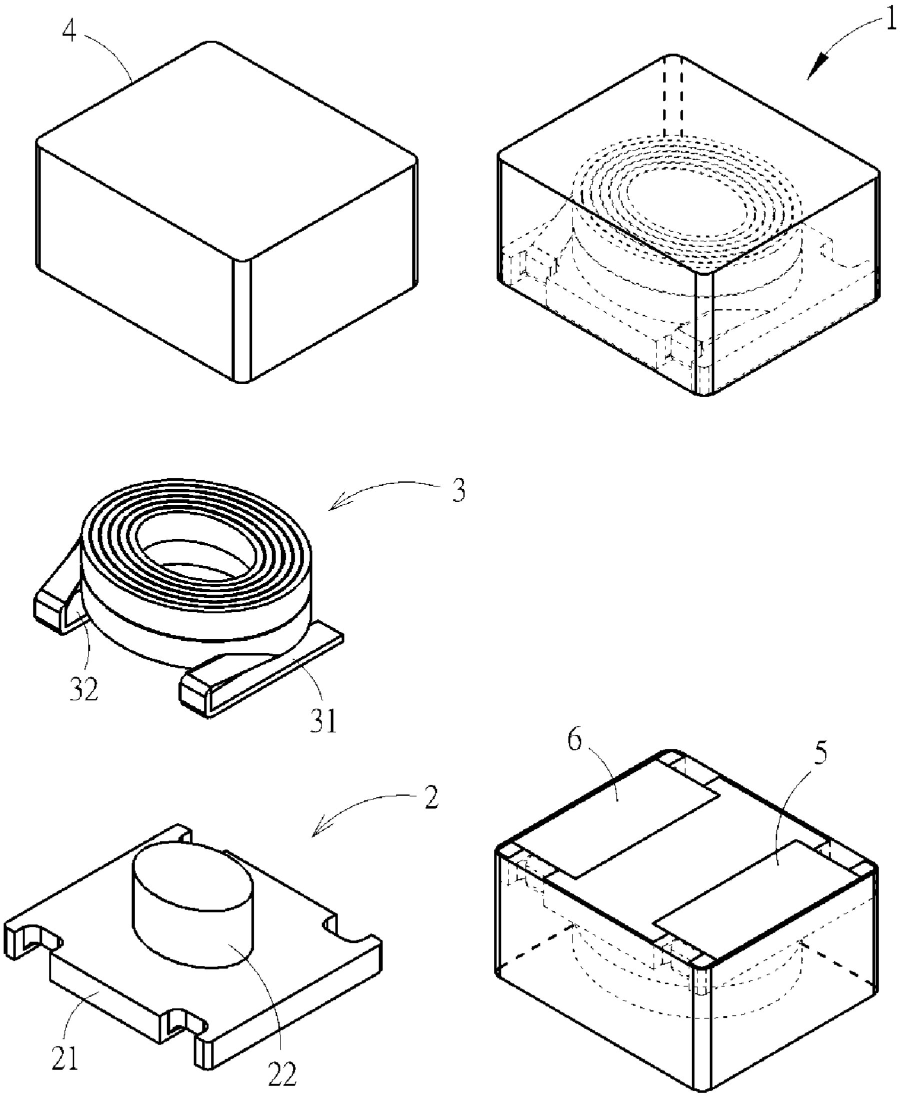
Figure 2G:
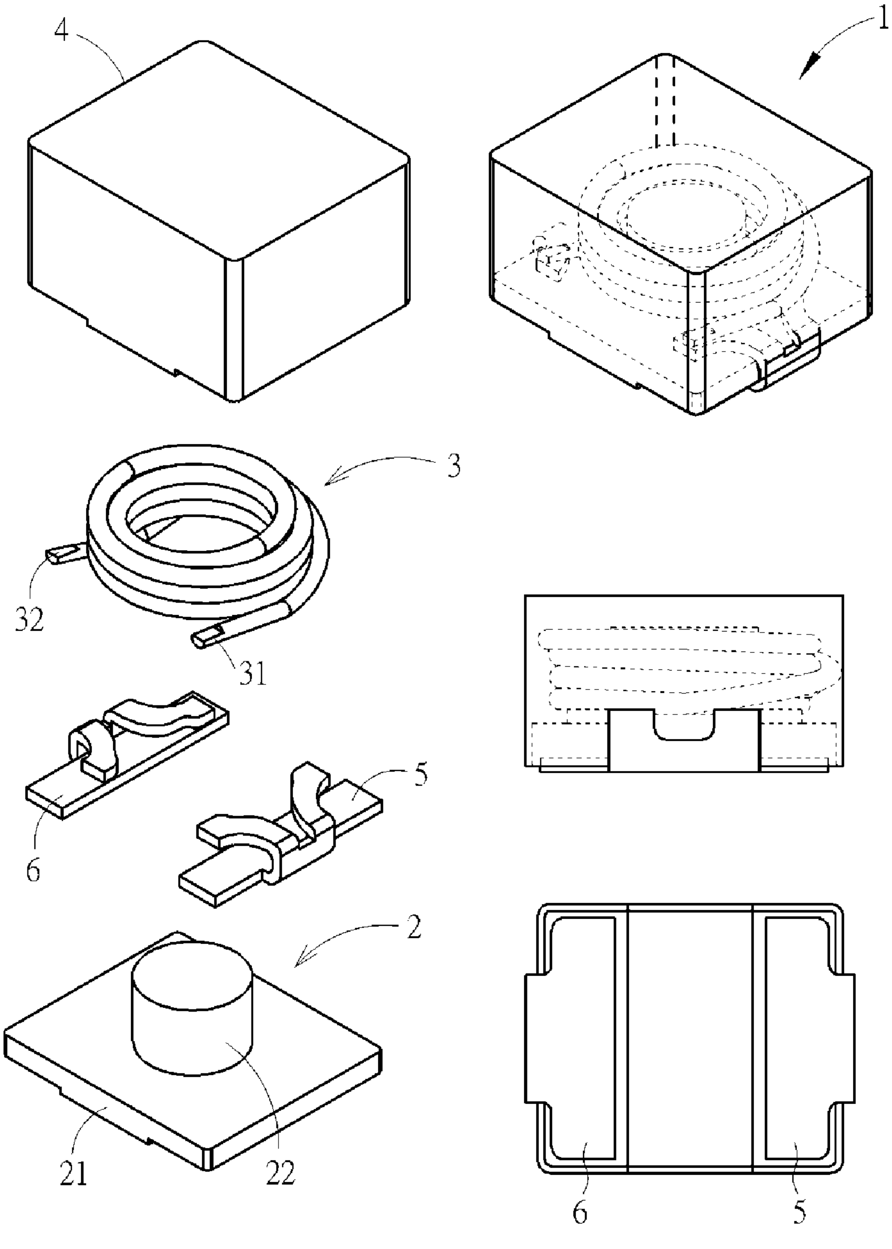

In another embodiment of the present invention, as shown in FIGS. 2A and 3D, the base 21 has two recesses 211, 212 respectively located on two lateral sides of the base 21, and the two recesses 211, 212 respectively receive the two leads 31, 32 of the wire coil 3. In the embodiment as shown in FIGS. 2A-2C, the two leads 31, 32 pass through the base 21 via the two recesses 211, 212 without electrodes on the base 21. In the embodiment as shown in FIG. 3D, the two leads 31, 32 are respectively in contact with the two electrodes 5, 6 via the two recesses 211, 212. In another embodiment of the present invention, as shown in FIGS. 2D, the base 21 does not have the recesses for receiving the two leads 31, 32; instead, the two leads 31, 32 extend through the magnetic body 4 at the lateral side of the choke 1 without passing through the base 21. In still other embodiments of the present invention, as shown in FIGS. 2E and 2F, the base 21 has two recesses on the same lateral side for receiving the two leads 31, 32. In still another embodiment of the present invention, as shown in FIG. 2G, the base 21 does not have the recesses for receiving the two leads 31, 32; instead, the two leads 31, 32 are fully located above the base 21, and are in contact with the two electrodes 5, 6 on the top surface of the base 21. The two electrodes 5, 6 in the embodiment shown in FIG. 2G extend from the bottom surface of the base 21 to the top surface of the base 21. In the embodiments shown in FIGS. 2A-2G, the magnetic body 4 fully covers the pillar 22, and any part of the base 21 that is located above the second/bottom surface of the base 21.

Figure 4A:
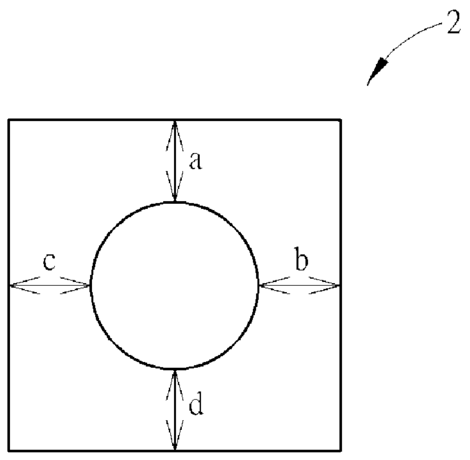
FIG. 4A is a top view of a T-shaped magnetic core in accordance with an embodiment of the present invention.
Figure 4B:
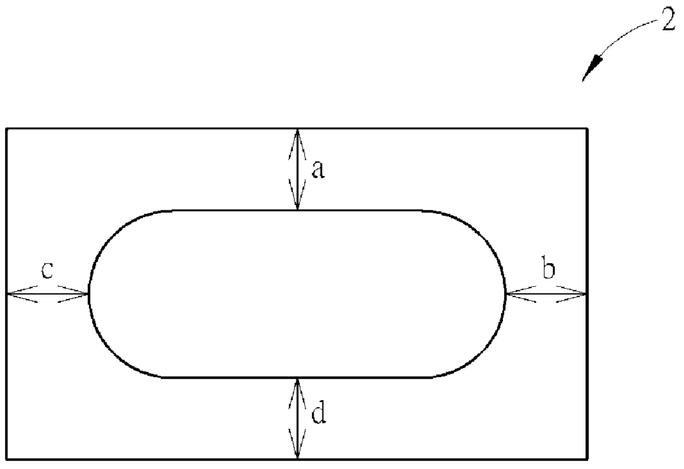
FIG. 4B is a top view of a T-shaped magnetic core in accordance with another embodiment of the present invention.
Figure 5A:
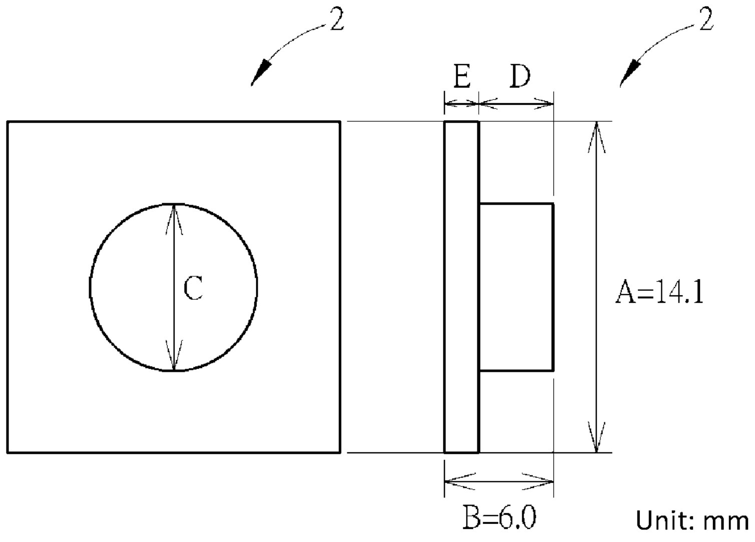
FIGS. 5A and 5B are lateral views and top views of T-shaped magnetic cores in accordance with two embodiments of the present invention.
Figure 5B:
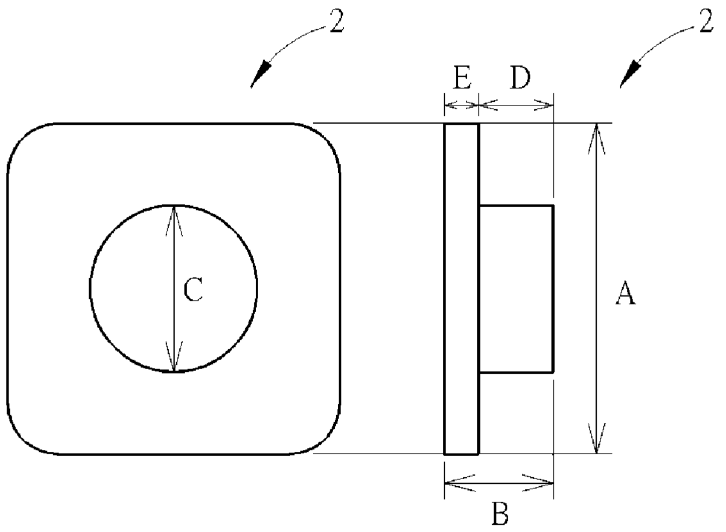

In an embodiment of the present invention, the base 21 is a rectangular (including a square) base with four right-angled corners or four curved corners (see FIGS. 5A and 5B), and a shortest distance (a, b, c, d as shown in FIGS. 4A and 4B) from each of the four ends of the rectangular base 21 to the pillar 22 is substantially the same (i.e., a=b=c=d). As a result, the magnetic circuit of the T-shaped magnetic core 2 is uniform and the core loss of the T-shaped magnetic core 2 can be minimized. It should be noted that FIGS. 4A and 4B simply illustrate the embodiments of the rectangular base 21 with four right-angled corners; however, the same features (i.e., a shortest distance (a, b, c, d) from each of the four ends of the rectangular base 21 to the pillar 22 is substantially the same (i.e., a=b=c=d)) also applied to the embodiments of the rectangular base 21 with four curved corners as shown in FIG. 5B.

In an embodiment of the present invention, the magnetic body 4 is made by mixing a thermal setting material (such as resin) and a material selected from the group consisting of iron-based amorphous powder, Fe—Si—Al alloy powder, permalloy powder, ferro-Si alloy powder, nanocrystalline alloy powder, and a combination of two or more thereof, and the mixture is then hot-pressed into a thermal setting mold where the T-shaped magnetic core 2 with the wire coil 3 thereon is located. Therefore, the hot-pressed mixture (i.e., the magnetic body 4) fully covers the pillar 22, any part of the base 21 that is located above the second/bottom surface of the base 21, and any part of the wire coil 3 that is located above the first/top surface of the base 21 as shown in FIGS. 2C and 2E-2G. In the embodiment as shown in FIG. 2D, the hot-pressed mixture (i.e., the magnetic body 4) fully covers the pillar 22, any part of the base 21 that is located above the second/bottom surface of the base 21, and any part of the wire coil 3 that is located directly above the first/top surface of the base 21, but does not cover a part of the wire coil 3 that is not located directly above the first/top surface of the base 21 (e.g., the two leads that are not located directly above the first/top surface of the base 21).

In an embodiment of the present invention, the permeability $\mu_B$ of the magnetic body has ±20% deviation from an average permeability $\mu_{BC}$ of the magnetic body 4, the average permeability $\mu_{BC}$ is equal to or larger than 6, and the core loss $P_{BL}$ (mW/cm³) of the magnetic body 4 satisfies:

$$2\times f^{1.29}\times Bm^{2.2}\leq P_{BL}\leq 14.03\times f^{1.29}\times B_m^{1.08}$$

In another embodiment of the present invention, the permeability $\mu_B$ of the magnetic body 4 satisfies: $9.85\leq\mu_B\leq 64.74$, and the core loss $P_{BL}$ (mW/cm³) of the magnetic body further satisfies:

$$2\times f^{1.29}\times Bm^{2.2}\leq P_{BL}\leq 11.23\times f^{1.29}\times B_m^{1.08}$$

In another embodiment of the present invention, the permeability $\mu_B$ of the magnetic body 4 satisfies: $20\leq\mu_B\leq 40$, and the core loss $P_{BL}$ (mW/cm³) of the magnetic body further satisfies:

$$2\times f^{1.29}\times Bm^{2.2}\leq P_{BL}\leq 3.74\times f^{1.29}\times B_m^{1.08}$$

In addition, in an embodiment of the present invention, the following requirement is also satisfied:

$$\mu_{BC}\times Hsat\leq 2250,$$

where Hsat (Oe) is a strength of the magnetic field at 80% of $\mu_{B0}$, where $\mu_{B0}$ is the permeability of the magnetic body 4 when the strength of the magnetic field is 0.

In addition, the dimension of the T-shaped magnetic core 2 will also affect the core loss of the choke. TABLE 6 shows the total core loss of the chokes with different dimensions of the T-shaped magnetic cores, where C is the diameter of the pillar 22, D is the height of the pillar 22, E is the thickness of the base 21, and the T-shaped magnetic cores in TABLE 6 have the same height B (6 mm) and same width A (14.1 mm), as shown in FIG. 5A. In addition, V1 is the volume of the base 21, V2 is the volume of the pillar 22, Vc is the volume of the T-shaped magnetic core 2 (i.e., V1+V2), and V is the volume of the thermal setting mold/choke 1. As shown in FIGS. 5A and 5B, the base of the T-shaped magnetic core 2 is a rectangular base with four right-angled corners or four curved corners.

In the examples of TABLE 6, the T-shaped magnetic core 2 is made of an annealed Fe—Si—Al alloy powder with permeability of about 60 (Sendust 60), and the magnetic body 4 is made of a hot-pressed mixture of resin and iron-based amorphous powder and has permeability of about 27.5. In addition, the size of the thermal setting mold (and therefore the size of the choke 1) V is 14.5×14.5’7.0=1471.75 mm³.

TABLE 6

| | Size | | | | | | | | | | |
|---|---|---|---|---|---|---|---|---|---|---|---|
| | 14.5 × 14.5 × 7.0 | | | | Core Material: Sendust 60<br>Hot-Pressed Mixture: μ = 27.5 | | | | | | |
| | Core | | | | Core Loss | | | | | Total Core | |
| NO. | C (mm) | D (mm) | E (mm) | V1/V2 | Part | ΔBm (mT) | $P_{CV}$ (kW/m³) | Volume (mm³) | CoreLoss (mW) | Loss (mW) | Vc/V |
| 1 | 5.5 | 5.2 | 0.8 | 1.288 | T-shaped Magnetic Core | 59.99 | 689.01 | 282.6 | 194.71 | 362.97 | 19.2% |
| | | | | | Magnetic Body | 14.79 | 209.31 | 803.9 | 168.26 | | |
| 2 | 5.0 | 4.0 | 2.0 | 5.065 | T-shaped Magnetic Core | 76.72 | 1169.26 | 476.2 | 556.80 | 760.52 | 32.26% |
| | | | | | Magnetic Body | 17.14 | 291.69 | 698.4 | 203.72 | | |
| 3 | 5.0 | 4.8 | 1.2 | 2.533 | T-shaped Magnetic Core | 78.9 | 1241.86 | 332.8 | 413.29 | 695.02 | 22.62% |
| | | | | | Magnetic Body | 18.22 | 334.65 | 841.8 | 281.73 | | |
| 4 | 6.5 | 4.8 | 1.2 | 1.4986 | T-shaped Magnetic Core | 50.79 | 481.70 | 397.9 | 191.67 | 428.10 | 27.04% |
| | | | | | Magnetic Body | 17.51 | 306.03 | 772.6 | 236.43 | | |
| 5 | 7.5 | 4.8 | 1.2 | 1.1256 | T-shaped Magnetic Core | 38.3 | 262.56 | 450.6 | 118.31 | 388.46 | 30.62% |
| | | | | | Magnetic Body | 18.98 | 366.9 | 736.3 | 270.15 | | |
| 6 | 6 | 4.8 | 1.2 | 1.7587 | T-shaped Magnetic Core | 54.95 | 570.54 | 373.11 | 212.87 | 408.55 | 25.35% |
| | | | | | Magnetic Body | 15.67 | 238.64 | 819.96 | 195.67 | | |

TABLE 6-continued

| | Size | | | | | | | | | | |
|---|---|---|---|---|---|---|---|---|---|---|---|
| | | | | | Core Material: Sendust 60 Hot-Pressed Mixture: $\mu$ = 27.5 | | | | | | |
| | 14.5 × 14.5 × 7.0 | | | | | Core Loss | | | | Total Core Loss | |
| | Core | | | | | | | | | | |
| NO. | C (mm) | D (mm) | E (mm) | V1/V2 | Part | ΔBm (mT) | $P_{CV}$ (kW/m$^3$) | Volume (mm$^3$) | CoreLoss (mW) | (mW) | Vc/V |
| 7 | 5.5 | 4.8 | 1.2 | 2.093 | T-shaped Magnetic Core | 65.96 | 845.01 | 351.59 | 297.10 | 483.24 | 23.89% |
| | | | | | Magnetic Body | 15.35 | 227.85 | 816.99 | 186.15 | | |
| 8 | 5.7 | 4.8 | 1.2 | 1.9487 | T-shaped Magnetic Core | 60.42 | 699.78 | 359.97 | 251.90 | 442.22 | 24.46% |
| | | | | | Magnetic Body | 15.64 | 237.59 | 801.03 | 193.20 | | |

As shown in TABLE 6, when the ratio of the volume V1 of the base 21 to the volume V2 of the pillar 22 (V1/V2) is equal to or smaller than 2.533, the total core loss of the choke 1 is 695.02 mW or less (i.e., V1/V2<2.533→total core loss≤695.02 mW). More preferably, when the ratio of the volume V1 of the base 21 to the volume V2 of the pillar 22 (V1/V2) is equal to or smaller than 2.093, the total core loss of the choke 1 is 483.24 mW or less (i.e., V1/V2≤2.093→total core loss≤483.24 mW). As can be seen in TABLE 6, when the size of the choke is set, the smaller the ratio V1/V2, the smaller the total core loss of the choke.

In addition, as shown in Example No. 5 in TABLE 6, the equivalent permeability of the choke is 40.73 with ±30% deviation. In other words, the equivalent permeability of the choke is between 28.511 and 52.949. In particular, the equivalent permeability of the choke may be measured by (but not limited to) a vibrating samples magnetometer (VSM) or determined by (but not limited to) measuring the dimension of the choke, the length and diameter of the wire coil, the wiring manner of the wire coil, and the inductance of the choke, applying the above-noted measurement to simulation software such as ANSYS Maxwell, Magnetics Designer, MAGNET, etc.

Figure 6:
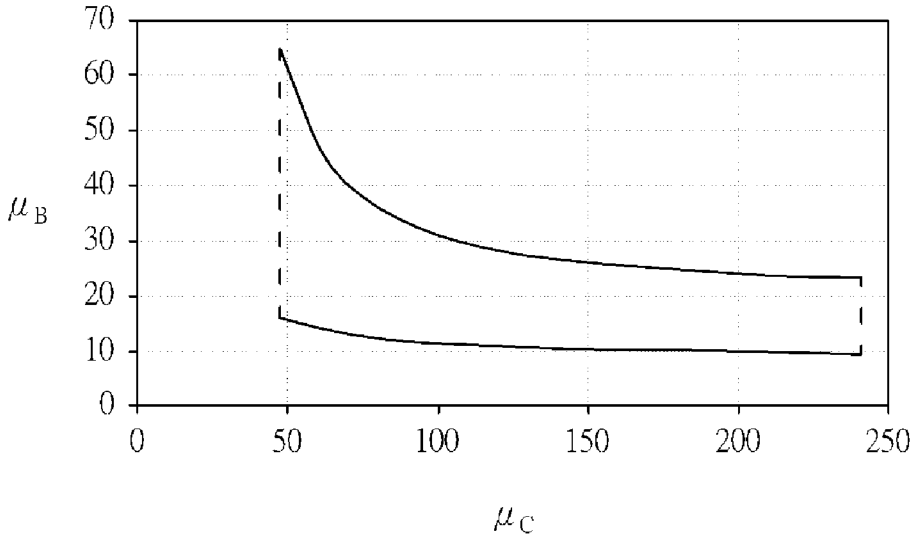
FIG. 6 illustrates curves showing the upper limit and the lower limit of the permeability of the T-shaped core and the permeability of the magnetic body and the relationship between the permeability of the T-shaped core and the permeability of the magnetic body in accordance with an embodiment of the present invention.

FIG. 6 illustrates a relationship between the permeability $\mu_C$ of the annealed T-shaped magnetic core 2 and the permeability $\mu_B$ of the magnetic body 4 based on Example No. 5 in TABLE 6. This relationship is obtained based on the target inductance of the choke 1 of Example No. 5 in TABLE 6 with ±30% deviation and different center permeabilities $\mu_{CC}$ of the annealed T-shaped magnetic core 2 with ±20% deviation (see TABLES 7-11).

TABLE 7

| 100% of Target Inductance & 100% of Permeability $\mu_C$ (i.e., $\mu_C = \mu_{CC}$) | |
|---|---|
| $\mu_C$ | $\mu_B$ |
| 60 | 27.5 |
| 75 | 23.98 |
| 90 | 21.66 |
| 125 | 18.93 |
| 150 | 17.94 |
| 200 | 16.80 |

TABLE 8

| 70% of Target Inductance (−30% deviation) & 80% of Permeability $\mu_C$ (−20% deviation) | |
|---|---|
| $\mu_C$ | $\mu_B$ |
| 48 | 16.52 |
| 60 | 14.50 |
| 72 | 13.32 |
| 100 | 11.79 |
| 120 | 11.21 |
| 160 | 10.49 |

TABLE 9

| 130% of Target Inductance (+30% deviation) & 80% of Permeability $\mu_C$ (−20% deviation) | |
|---|---|
| $\mu_C$ | $\mu_B$ |
| 48 | 64.74 |
| 60 | 47.98 |
| 72 | 39.50 |
| 100 | 31.69 |
| 120 | 28.86 |
| 160 | 25.81 |

TABLE 10

| 70% of Target Inductance (−30% deviation) & 120% of Permeability $\mu_C$ (+20% deviation) | |
|---|---|
| $\mu_C$ | $\mu_B$ |
| 72 | 13.32 |
| 90 | 12.21 |
| 108 | 11.52 |
| 150 | 10.61 |
| 180 | 10.26 |
| 240 | 9.85 |

TABLE 11

| 130% of Target Inductance (+30% deviation) & 120% of Permeability $\mu_C$ (+20% deviation) | |
|---|---|
| $\mu_C$ | $\mu_B$ |
| 72 | 39.50 |
| 90 | 33.76 |
| 108 | 30.05 |
| 150 | 26.33 |
| 180 | 25.02 |
| 240 | 23.31 |

Therefore, as long as the permeability $\mu_C$ of the annealed T-shaped magnetic core 2 and the permeability $\mu_B$ of the magnetic body 4 are located at any point within the range as shown in FIG. 6, the choke having the target inductance with ±30% deviation can be achieved. For example, when the permeability $\mu_C$ of the annealed T-shaped magnetic core 2 is 48, the permeability $\mu_B$ of the magnetic body 4 can be between 16.52 and 64.74; when the permeability $\mu_C$ of the annealed T-shaped magnetic core 2 is 60, the permeability $\mu_B$ of the magnetic body 4 can be between 14.50 and 47.98; when the permeability $\mu_C$ of the annealed T-shaped magnetic core 2 is 240, the permeability $\mu_B$ of the magnetic body 4 can be between 9.85 and 23.31 (see TABLE 12 below). As can be seen in FIG. 6 and TABLE 12, the higher the permeability $\mu_C$ is, the smaller the range of the permeability $\mu_B$ is, and the lower the upper limit and the lower limit of the permeability $\mu_B$ are.

TABLE 12

| $\mu_C$ | $\mu_B$ |
|---|---|
| 48 | 16.52-64.74 |
| 60 | 14.50-47.98 |
| 72 | 13.32-39.50 |
| 90 | 12.21-33.76 |
| 100 | 11.79-31.69 |
| 108 | 11.52-30.05 |
| 120 | 11.21-28.86 |
| 150 | 10.61-26.33 |
| 160 | 10.49-25.81 |
| 180 | 10.26-25.02 |
| 240 | 9.85-23.31 |

Figure 7:
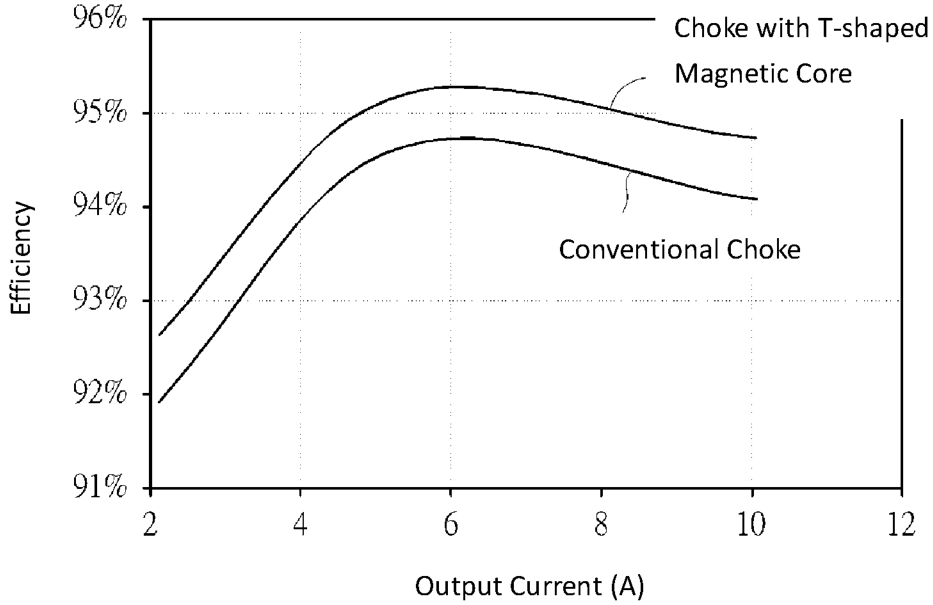
FIG. 7 illustrates the efficiency comparison between a choke in accordance with an embodiment of the present invention and a conventional choke with a toroidal core.

FIG. 7 illustrates the efficiency comparison between the choke 1 in Example No. 5 of TABLE 6 and a conventional choke with a toroidal core. In particular, the choke 1 in Example No. 5 of TABLE 6 has the annealed T-shaped magnetic core 2 made of annealed Fe—Si—Al alloy powder (Sendust) with permeability of 60 and the magnetic body 4 made of iron-based amorphous powder with permeability of 27.5, and the dimension of the choke is 14.5×14.5×7 $mm^3$. On the other hand, the conventional choke with a toroidal core made of Fe—Si—Al alloy powder (Sendust) with permeability of 60 and the dimension of the conventional choke is 17×17×12 $mm^3$ (max). TABLE 13 also shows the performance of the choke 1 in Example No. 5 of TABLE 6 and the conventional choke with the toroidal core.

TABLE 13

| | Dimension | $L_0$ (μH) | DCR (mΩ) | Current (A)@ $L_{sat}$ = 4.1 μH | Power Loss (mw) @ 2 A | Power Loss (mw) @ 10.5 A |
|---|---|---|---|---|---|---|
| Conventional Choke with Toroidal Core | 17 × 17 × 12 $mm^3$ (max) | 6.91 | 6.35 | 11.8 | 485.3 | 1360.5 |
| Choke with Annealed T-shaped Magnetic Core (Example No. 5 in TABLE 6) | 14.5 × 14.5 × 7 $mm^3$ | 6.43 | 5.9 | 21.8 | 412.06 | 1221.8 |

As can been seen in FIG. 7 and TABLE 13, the efficiency (higher saturation current and lower power loss at heavy load) of the choke 1 with an annealed T-shaped magnetic core 2 is significantly higher than the conventional choke with a toroidal core. Therefore, the choke with an annealed T-shaped magnetic core provides a superior solution for high saturation current at heavy load and low core loss at light load.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic device, comprising:

a T-shaped magnetic core, comprising a magnetic powder, wherein the T-shaped magnetic core comprises a base and a pillar, wherein the base comprises a top surface and a bottom surface opposite to the top surface, and the pillar is located on the top surface of the base;

a coil, wound on the pillar; and a magnetic body, encapsulating the pillar and the coil, wherein the magnetic body and the bottom surface of the base form an outer surface of the magnetic device, wherein the magnetic body does not have any portion that is located below the bottom surface of the base of the T-shaped magnetic core, wherein a first portion of the magnetic body extending in a direction from the top surface to the bottom surface of the base of the T-shaped magnetic core is in contact with a first lateral surface of the base of the T-shaped magnetic, wherein an electrode is disposed on the bottom surface of the base of the T-shaped magnetic core and extends to a bottom surface of the first portion of the magnetic body, wherein a unitary and contiguous top surface of the electrode is in contact with a contiguous surface formed by the bottom surface of the base of the T-shaped magnetic core and the bottom surface of the first portion of the magnetic body;

wherein μC×Hsat(Oe)≥1800, where μC is a permeability of the T-shaped magnetic core, and Hsat(Oe) is a strength of the magnetic field at 80% of μC0, where μC0 is the permeability of the T-shaped magnetic core when the strength of the magnetic field is 0.

2. The magnetic device of claim 1, wherein the wherein μC×Hsat≥2250.

3. The magnetic device of claim 1, wherein the wherein μC×Hsat≥2520.

4. The magnetic device of claim 1, wherein the magnetic device is an inductor.

5. The magnetic device of claim 1, wherein the magnetic powder comprises Fe—Si alloy powder, wherein the permeability of the T-shaped magnetic core is between 48 and 108.

6. The magnetic device of claim 1, wherein the magnetic powder comprises Fe—Si—Al alloy powder, wherein the permeability of the T-shaped magnetic core is between 48 and 150.

7. The magnetic device of claim 4, wherein a total core loss of the inductor is not greater than 695.02 mW.

8. The magnetic device of claim 1, wherein μB×Hsat_B (Oe)≥2250, where μB is a permeability of the magnetic body, and Hsat_B(Oe) is a strength of the magnetic field at 80% of μB0, where μB0 is the permeability of the magnetic body when the strength of the magnetic field is 0.

9. The magnetic device of claim 1, wherein the magnetic device is a choke.

10. A magnetic device, comprising:

a T-shaped magnetic core, comprising a magnetic powder, wherein the T-shaped magnetic core comprises a base and a pillar integrally formed with the base, the base having a top surface and a bottom surface opposite to the top surface side, the pillar being located on the top surface of the base;

a coil wound on the pillar; and a magnetic body, encapsulating the pillar, the coil and a portion of the base with the bottom surface of the base being not covered by the magnetic body, wherein the magnetic body and the bottom surface of the base form an outer surface of the magnetic device, wherein the magnetic body does not have any portion that is located below the bottom surface of the base of the T-shaped magnetic core, wherein a portion of the magnetic body is in contact with a lateral surface of the base of the T-shaped magnetic core;

wherein a core loss $P_{CL}$ (mW/cm$^3$) of the T-shaped magnetic core satisfies:

$$0.64\times f^{0.95}\times B_m^{2.20}\leq P_{CL}\leq 7.26\times f^{1.41}\times B_m^{1.08}$$

where f (kHz) represents a frequency of a magnetic field applied to the T-shaped magnetic core, and $B_m$ (kGauss) represents the operating magnetic flux density of the magnetic field at the frequency; and wherein a permeability of the magnetic body is equal to or larger than 4.8, and the core loss $P_{BL}$ (mW/cm$^3$) of the magnetic body satisfies:

$$2\times f^{1.29}\times Bm^{2.2}\leq P_{BL}\leq 3.74\times f^{1.29}\times B_m^{1.08}.$$

11. The magnetic device of claim 10, wherein μB×Hsat_B (Oe)≥2250, where μB is a permeability of the magnetic body, and Hsat_B(Oe) is a strength of the magnetic field at 80% of μB0, where μB0 is the permeability of the magnetic body when the strength of the magnetic field is 0.

12. The magnetic device of claim 10, wherein the magnetic device is an inductor.

* * * * *